United States Patent [19]

Cornu et al.

[11] 4,363,777

[45] Dec. 14, 1982

[54] CLOSURE ELEMENT FOR LIMITING THE CONVECTION CURRENTS IN AN ANNULAR SPACE ABOUT A NUCLEAR REACTOR COMPONENT

[75] Inventors: Bernard Cornu, Les Clayes-sous-Bois; Jean-Louis Pierrey, Bourg la Reine, both of France

[73] Assignee: Novatome, Le Plessis Robinson, France

[21] Appl. No.: 203,764

[22] Filed: Nov. 3, 1980

[30] Foreign Application Priority Data

Nov. 23, 1979 [FR] France ................ 79 28879

[51] Int. Cl.³ .......................................... G21C 13/00
[52] U.S. Cl. ................................ 376/203; 376/405; 220/228; 277/135
[58] Field of Search ................ 376/203–206, 376/404, 405, 461; 137/254, 251; 220/217, 228, 232, 240; 277/135

[56] References Cited

U.S. PATENT DOCUMENTS 3,324,007  6/1967  Baxter .................. 376/203
3,877,488  4/1975  Baturay et al. ........... 137/254

FOREIGN PATENT DOCUMENTS 931598  8/1955  Fed. Rep. of Germany ...... 277/135

*Primary Examiner*—Harvey E. Behrend
*Attorney, Agent, or Firm*—Pollock, Vande Sande & Priddy

[57] ABSTRACT

The apparatus comprises an annular cup (5) solid with the component (1) and surrounding its outer wall, a frusto-conical support surface (9) having as axis the vertical axis (2) of the component (1) fixed at the perimeter of its large base to the passage (4) into which the component (1) passes and a closure element (14) with rotational symmetry. The closure element (14) has an upper part (15) which rests on the support surface (9) so as to totally close the annular space (18) at the top and a part directed downwards constituted by a sleeve whose lower part goes into the cup (5). The cup (5) fills up with liquid metal (17) which condenses when the reactor is operating, which ensures sealing between the sleeve (4) and the cup (5).

The invention is particularly applicable to fast neutron nuclear reactors cooled by liquid sodium.

2 Claims, 1 Drawing Figure

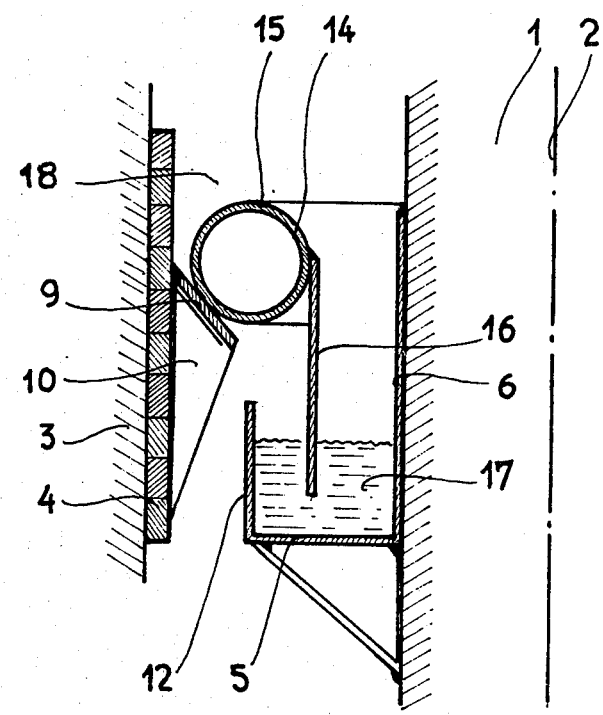

CLOSURE ELEMENT FOR LIMITING THE CONVECTION CURRENTS IN AN ANNULAR SPACE ABOUT A NUCLEAR REACTOR COMPONENT

FIELD OF THE INVENTION

The invention concerns a closure apparatus for limiting the convection currents in an annular space about a component of a fast neutron nuclear reactor cooled by a liquid metal having a vessel closed by a very thick horizontal plate in which vertical cylindrical passages are made for the passage of removable components vertically disposed in the reactor and resting on the plate.

Examples of such components are components with very large dimensions such as the primary pump, the intermediate exchanger or the coolant fluid preheating pipe or components of smaller dimensions such as the apparatus incorporated for purification of the coolant fluid.

These components must be removable in all instances so as to allow their replacement or repair after the reactor has been operating for a certain time.

The components enter vertically into the vessel of the reactor containing the liquid metal, generally liquid sodium, at passages made in the reactor plate.

To facilitate handling of the elements, passages are provided with a diameter sufficiently larger than the diameter of the component for there to be an annular space of relatively great width between the outer surface of the component where this component passes through the plate and the inner surface of the passage constituted by a cylindrical sleeve fixed in an aperture in the plate.

Sealing between the component and the reactor vessel, when the component is in position, is achieved by seals at the upper enlarged part of the component resting on the plate.

It is therefore necessary to limit the convection currents between the interior of the vessel containing liquid sodium and the upper part of the component resting on the plate, inside the annular space between component and passage, in order to avoid inadmissable heating of the support structure. It is also essential to limit as much as possible the circulation of sodium vapor to the upper level of the component so as to avoid jamming of this component at extraction thereof.

PRIOR ART

An annular cup has therefore been designed, disposed on the inner surface of the sleeve constituting the passage in the plate and in particular its periphery, inside which a sleeve solid with the outer surface of the component is positioned, when the component is put into position for use in the reactor.

When the reactor is started up again, the annular cup fills with liquid sodium from the vapor condensed in this hollow receptacle disposed in a region which is cooler than the inner space of the vessel.

In this way, the sleeve solid with the component dips into a liquid metal which creates a barrier against convection currents and flows of sodium vapor.

However, when the component is put in position, positioning of the sleeve solid with the component inside the annular cup is a tricky operation during which deformation or destruction of the sleeve and the annular socket can occur. The same is true if the cup is solid with the outer surface of the component and the sleeve with the passage in the plate.

SUMMARY OF THE INVENTION

The object of the invention is therefore to propose a closure apparatus for limiting the convection currents in an annular space about a component of a fast neutron nuclear reactor cooled by a liquid metal, having a vessel closed by a very thick horizontal plate in which vertical cylindrical passages are provided for the passage of removable components disposed vertically in the reactor and resting on the plate, each of these components having between its outer surface and the inner surface of the corresponding passage an annular space of a certain width in which is positioned the closure apparatus of the type with an annular cup solid with the component and surrounding its outer wall and containing a liquid into which a sleeve dips so as to ensure closure of the annular space about the component, this apparatus being intended to allow limitation of the convection currents and the flows of sodium inside the annular passage while avoiding complicating the handling maneuvres involved in putting the component in position or removing it.

With this object, the apparatus also has:

a frusto-conical support surface having as axis the vertical axis common to the component and the passage, fixed at the perimeter of its large base to the passage, and having its small base disposed at a level lower than the level of the large base, with a diameter greater than the external diameter of the cup, and a closure element with rotational symmetry not connected to the cup and the support surface having an upper part intended to rest on the support surface so as to totally close the annular space at the top when the component is put in position in the reactor, the cup being then below the support surface, and a part directed downwards constituted by the sleeve resting in the cup when the component is handled and ensuring closure of the annular space at the bottom, when the reactor is in service, the cup then filling up with liquid metal.

BRIEF DESCRIPTION OF THE DRAWING

To enable the invention to be fully understood, an embodiment of the apparatus according to the invention will now be described by way of non-limiting example, with reference to the single attached FIGURE.

The single FIGURE represents a sectional half-view of the part of a component disposed at a passage of the vessel of a fast neutron reactor and of the closure apparatus according to the invention.

DETAILED DESCRIPTION OF AN EMBODIMENT

The FIGURE shows the component 1, substantially cylindrical in shape, disposed inside a cylindrical space provided in the plate 3 of a fast neutron nuclear reactor.

The cylindrical aperture of the plate bounded by a cylindrical sleeve 4 and the component 1 have the vertical axis 2 as common axis of symmetry when the component is in position as represented in the single FIGURE.

On the outer surface of the component and completely surrounding this component, an annular cup 5 is disposed, whose vertical, inwardly disposed wall 6 is welded to the body of the component.

On the inner surface of the sleeve 4 facing towards the component, a frusto-conical support element 9 is welded at the perimeter of its upwardly disposed large base.

The axis of the frusto-conical element 9 coincides with the axis 2 common to the passage and the component.

This element 9 is held rigid by a set of supporting brackets such as 10 fixed on the sleeve 4.

The diameter of the downwardly disposed small base of this frusto-conical element is greater than the external diameter of the cup, i.e. than the diameter of the sleeve 12 constituting the outer wall of the cup.

The closure element 14 completing the apparatus is constituted by a toroidal ring 15 resting on the upper surface of the frusto-conical element 9 constituting the support surface and a sleeve 16 welded to this toridal ring, so that the whole of the closure element 14 presents a rotational symmetry with respect to the axis 2.

In the single FIGURE, the elements constituting the closure apparatus are shown in the position in which this closure is obtained, with the nuclear reactor in operation.

Sodium vapor then rises up from the part of the vessel containing liquid sodium to the annular space and condenses in the cup 5, constituting a seal of liquid metal 17 into which the lower part of the sleeve 16 dips.

The lower part of the annular space is thus isolated from the upper part of this space above the closure apparatus since the ring 15 rests on the upper surface of the frusto-conical element 9 and ensures a degree of sealing which allows too intense a circulation of convection currents and of sodium vapor from the lower part to the upper part of the annular space 18, into which argon is sent to ensure sealing, to be avoided.

When the component 1 is being removed and this component is raised in the direction along the axis 2, the closure apparatus 14 comes to rest with the lower part of the sleeve 16 on the bottom of the cup 5. The whole of the apparatus 14 is then raised above the frusto-conical support element 9.

No special precautions have to be taken when the component 1 is put back in position, since, when the component is lowered into its service position, the apparatus 14 moves into position on the support element 9 and centres automatically through the toroidal ring and the frusto-conical support surface.

When the power of the reactor increases, following its starting up, sodium vapor rises to the level of the cup 5 and fills this cup up again so as to constitute a seal of liquid metal 17.

The principal advantages of the invention, as shown, are therefore that the closure apparatus is very efficient, positions itself correctly and automatically when the component is handled, is very easily installed and also allows problems relating to expansion and movement of the component with respect to the passage to be avoided.

However, the invention is not limited to the embodiment just described; it also includes all the variants thereof.

Thus, the cup can be any shape, since its section in a meridian plane shown in the single FIGURE does not have to be square or rectangular.

The closure apparatus 14 with rotational symmetry about the axis 2 can also differ in shape from the one represented in the FIGURE and in particular the sleeve 16 can have a frusto-conical part joining with a cylindrical part.

The upper part of the cup can also have a surface for supporting or guiding the closure apparatus when the component is put in position.

Lastly, the apparatus according to the invention is applicable in all nuclear reactors cooled by a liquid metal.

We claim:

1. Closure apparatus to limit convection currents in an annular space (18) about a component (1) of a nuclear reactor cooled by a liquid metal, having a vessel closed by a very thick horizontal plate in which vertical cylindrical passages are provided for the passage of removable components disposed vertically in the reactor and resting on the plate, each of the components having between its outer surface and the inner surface of the passage an annular space (18) of a certain width in which is positioned the closure apparatus of the type having an annular cup (5) solid with the component (1) and surrounding its outer wall and containing a liquid into which a sleeve (16) dips so as to ensure closure of the annular space (18) about the component (1) characterised by the fact that it also has:

a frusto-conical support surface (9) having as axis the vertical axis common to the component and the passage fixed at the perimeter of its large base at the passage and having its small base disposed at a lower level than the level of the large base, of a diameter greater than the external diameter of the cup (5), and a closure element (14) with rotational symmetry, not connected to the cup (5) and the support surface (9), having an upper part (15) intended to come to rest on the support surface (9) so as to totally close the annular space (18) at the top when the component is put in position in the reactor, the cup (5) being then below the support surface (9) and a part directed downwards constituted by the sleeve (16) resting in the cup (5) when the component (1) is handled and ensuring closure of the annular space (18) at the bottom, when the reactor is in service, the cup (5) then filling up with liquid metal.

2. Closure apparatus according to claim 1, characterised by the fact that the sleeve (16) constituting the lower part of the closure element (14) has a cylindrical part and a frusto-conical part.

* * * * *